A. M. LAWRENCE.
HACKSAW BLADE.
APPLICATION FILED MAY 20, 1919.
1,369,178.
Patented Feb. 22, 1921.
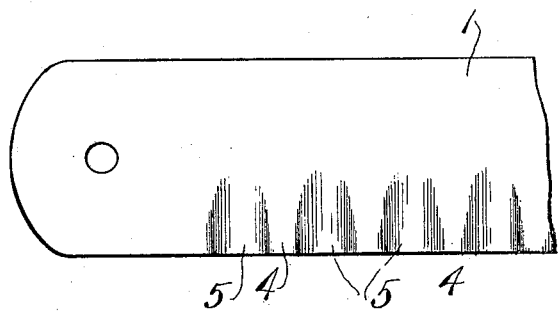
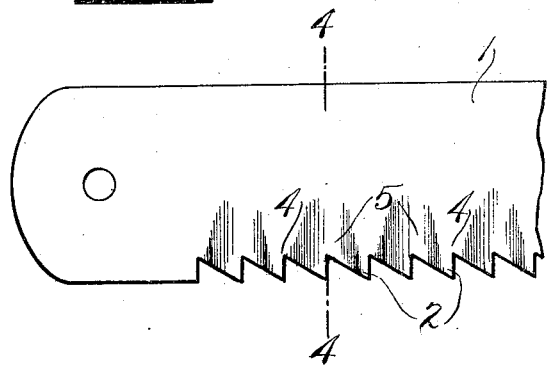 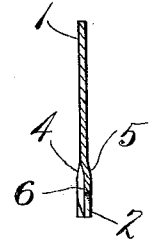
INVENTOR
AUSTIN M. LAWRENCE
BY
Wm Wallace White
ATTORNEY

UNITED STATES PATENT OFFICE.

AUSTIN M. LAWRENCE, OF MONTAGUE, MASSACHUSETTS.

HACKSAW-BLADE.

1,369,178. Specification of Letters Patent. Patented Feb. 22, 1921.

Application filed May 20, 1919. Serial No. 298,460.

*To all whom it may concern:*

Be it known that I, AUSTIN M. LAWRENCE, a citizen of the United States, residing at Montague, county of Franklin, Commonwealth of Massachusetts, have invented new and useful Improvements in Hacksaw-Blades, of which the following is a specification.

My invention relates to hack saw blades, and particularly to a novel method of forming them.

In hack saw blade construction it is usual to cut the teeth, and then "set" them; and this setting is usually accomplished by bending the teeth outward to one side or the other at their roots about an axis parallel to the longitudinal direction of the blade. This throws the cutting edge of the teeth at an angle, and the consequence is that the lower corners of the teeth cut on the bottom of the kerf and the corners projecting outward cut on the sides of the kerf; and these small sections of teeth having to take extreme pressures and most of the wear are rapidly worn away.

It is one object of my invention, then, to provide a hack saw in which the cutting edges of the teeth lie transversely of the blade, and in a plane parallel to the direction of the thickness of the blade. A further object of my invention comprises a novel method of forming a hack saw blade to fulfil the first object. Another object is to provide a hack saw blade having teeth of a particular form, and a blade body of particular form, hereinafter to be described, for the purpose of making a saw that will cut more smoothly, will last longer, and will give a better finish to the cut than those heretofore in use.

With the foregoing objects in mind, my invention consists in the combination, construction, and arrangement of parts herein described, illustrated, and claimed. For purposes of illustration, I have shown in the accompanying drawings, forming part hereof, a preferred embodiment of my invention. In these drawings, similar reference characters designate corresponding parts in all views, and Figure 1 shows a part of a blank corrugated;

Fig. 2 is a side elevation of part of a hack saw blade constructed in accordance with the invention;

Fig. 3 is a plan looking upward at Fig. 2; and,

Fig. 4 is a section taken approximately on the line 4—4 of Fig. 2.

Referring to these drawings, the blade 1 is provided with teeth 2, the cutting edges 3 of which are offset alternately to the side, but preferably lie in the direction of the thickness of the blade, and at right angles to the direction of motion of the blade, and all in the same plane.

The method which I prefer to employ to obtain this construction consists in starting with a blank for a hack saw, with both edges smooth, no teeth having been cut. Along one edge of this blank I form a series of corrugations comprising raised portions 4 and equivalent depressed portions 5. This may be done by hand or other well-known means, but I prefer to employ gear like die mechanism by means of which I press the corrugations into the metal of the blade. These corrugations are preferably made of such dimensions with respect to the thickness of the blade that the distance over all in this direction is less than twice the thickness of the blade, so that the cuts of teeth offset to opposite sides overlap during operation.

The depth of the corrugations, measured in the same direction as the depth of the blade, I prefer to make somewhat greater than the depth of a tooth, and the elements of the surfaces of the corrugations are preferably kept parallel to the depth of the blade for a distance equal to or greater than the depth of a tooth.

Having formed these corrugations in the blade, the next step is to cut away the metal so as to form the teeth, although if desired the teeth might be cut first, and then the corrugations formed. This is done in such a way that the cutting edges of the teeth are formed on the offset parts of the blade, preferably at the part of the corrugation farthest offset from the longitudinal center line of the blade; and in the case of fine toothed saws, other teeth may be formed intermediately of the aforesaid.

By making the depth of the corrugations greater than the depth of a tooth, the outside edges 6 of the teeth are made substantially perpendicular to the cutting edges 3, and consequently serve to steady the saw in the kerf, and as these edges are sharp, they tend to finish smoothly the walls of the kerf. The corrugations may be carried a material distance above the teeth if desired, so as to exert an additional steadying and alining influence, tending to insure that the saw blade once properly started will pass straight through the work. These corrugations have the further advantage of assisting in clearing the cut of chips, as space between the hollows of the corrugations and walls of the kerf is always maintained on both sides.

The form of the completed teeth is such that only line contact is made with the wall of the kerf; and the same may be said of the corrugations above the teeth; so that a maximum space is afforded for clearing the kerf of chips, and the friction against the side walls is reduced to a minimum.

Having now set forth my invention, I claim and desire to secure by United States Letters Patent:

1. A hacksaw blade having a corrugated toothed edge, the elements of the surfaces of the corrugations being parallel to the depth of the blade for a distance slightly greater than the depth of the teeth, and the cutting edges of the teeth being parallel.

2. A hacksaw blade provided with corrugations along its toothed edge, the pitch of the corrugations corresponding with the pitch of the teeth, and the teeth being located at the points of the corrugations farthest offset.

In testimony whereof I have signed my name to this specification.

AUSTIN M. LAWRENCE.